United States Patent
Peng et al.

(10) Patent No.: US 8,891,867 B2
(45) Date of Patent: Nov. 18, 2014

(54) IMAGE PROCESSING METHOD

(71) Applicant: Altek Semiconductor Corp., Hsinchu (TW)

(72) Inventors: Shih-Yuan Peng, New Taipei (TW); Shan-Lung Chao, Hsinchu (TW); Hong-Long Chou, Hsinchu County (TW)

(73) Assignee: Altek Semiconductor Corp., Hsinchu (TW)

( * ) Notice: Subject to any disclaimer, the term of this patent is extended or adjusted under 35 U.S.C. 154(b) by 48 days.

(21) Appl. No.: 13/905,146

(22) Filed: May 30, 2013

(65) Prior Publication Data

US 2014/0219578 A1 Aug. 7, 2014

(30) Foreign Application Priority Data

Feb. 7, 2013 (TW) .............................. 102104959 A (51) Int. Cl.
*G06K 9/00* (2006.01)
*G06T 5/00* (2006.01)
*H04N 1/60* (2006.01)

(52) U.S. Cl.
CPC ...... *G06T 5/002* (2013.01); *H04N 1/60* (2013.01); *G06T 2207/10024* (2013.01)
USPC .......................................................... 382/167

(58) Field of Classification Search
USPC ........................ 382/162, 167, 264, 274, 275
See application file for complete search history.

(56) References Cited

U.S. PATENT DOCUMENTS

| 8,457,433 | B2 * | 6/2013 | Hong ............................ 382/260 |
| 8,559,745 | B2 * | 10/2013 | Peng et al. .................... 382/263 |
| 2013/0064448 | A1 * | 3/2013 | Tomaselli et al. ............. 382/167 |

* cited by examiner

*Primary Examiner* — Phuoc Tran
(74) *Attorney, Agent, or Firm* — Jianq Chyun IP Office (57) ABSTRACT

An image processing method is provided and includes the following steps. A source image arranged in a Bayer pattern is captured. A first-order image process is performed on the source image to produce a first image in YCbCr format. A second-order image process is performed on the source image to produce a second image in YCbCr format. Then, a noise-reducing process is performed on the first image in YCbCr format to produce a noise-reduced image. A blending operation is performed on luminance image of the noise-reduced image and luminance image of the second image in YCbCr format, and thereafter a chrominance image is combined with the blended image to produce a processed image. A noise reducing degree of the noise-reduced image is higher than that of the second image in YCbCr format.

10 Claims, 6 Drawing Sheets

IMAGE PROCESSING METHOD

CROSS-REFERENCE TO RELATED APPLICATION

This application claims the priority benefit of Taiwan application serial no. 102104959, filed on Feb. 7, 2013. The entirety of the above-mentioned patent application is hereby incorporated by reference herein and made a part of this specification.

BACKGROUND

1. Field of the Invention

The present invention is directed to an image processing technique and more particularly, to an image processing method to keep natural appearance of a noise-reduced image.

2. Description of Related Art

In a digital camera application, noise-reducing is very important and critical process to a digital image captured in high ISO mode. After the noise-reducing process, it often happens that detailed textures together with gradient lighting changes of an object itself in a digital image are also blurred or disappear, such that the digital image become un-natural.

In order to keep a natural appearance for the digital image, a post process performed on a noise-reduced image generally adopts an image sharpness algorithm to enhance edges of an object in the image to achieve a sharpening effect. In order to deal with a side-effect that the natural appearance disappears after the noise-reducing process, a method which is generally adopted is to adjust parameters in the noise-reducing process to mitigate the side-effect of noise-reduction and to assign different noise-reducing parameters for a smoothing area, a texture area or a sharpness edge of the image while noise-reducing.

For overly blurry images after being noise-reduction, the sharpness algorithm may be utilized to sharpen the object edges or the texture area to increase the image details. However, during the noise-reducing process, the method of assigning different parameters according to the difference of the smoothing area, which would result in a larger difference between the smooth area and the texture area or the sharpness edge of the image. As a result, the processed image would look unnatural. Further, if the noise-reducing parameters are adjusted to mitigate the difference between each area, a problem that the noise cannot be clearly reduced. Accordingly, how to keep the natural appearance of the noise-reduced image has become a subject to be solved.

SUMMARY

The present invention is directed to an image processing method to retain more detailed information of a noise-reduced image and reproduce a natural appearance of such image.

An image processing method provided by the present invention includes the steps as follows. A source image arranged in a Bayer pattern is captured by an image sensor. A first-order image process is performed on the source image to produce a first image in YCbCr format. A second-order image process is performed on the source image to produce a second image in YCbCr format. Then, a noise-reducing process is performed on the first image in YCbCr format to produce a noise-reduced image. A blending operation is performed on luminance image of the noise-reduced image and luminance image of the second image in YCbCr format and thereafter, chrominance image of the second image in YCbCr format is combined with the blended image to produce a processed image. The noise level of the noise-reduced image is lower than the noise level of the second image in YCbCr format.

In an embodiment of the present invention, the step of performing the first-order image process includes performing a Bayer noise-reducing process on the source image in Bayer format and then performing a color interpolation process and a color reproduction process to produce the first image in YCbCr format.

In an embodiment of the present invention, the step of performing the second-order image process includes directly performing the color interpolation process and the color reproduction process on the source image without noise-reducing process to produce the second image in YCbCr format.

In an embodiment of the present invention, after the step of performing the second-order image process on the source image to produce the second image in YCbCr format, the method further includes generating a noise map corresponding to the luminance image and blending the noise map into the luminance image, the noise map and the chrominance image to produce an output image having noise with different characteristics.

In an embodiment of the present invention, the size of the noise map is identical to that of the luminance image.

In an embodiment of the present invention, the noise map comprises a plurality of positive values or negative values, and each of the values corresponds to each pixel in the luminance image.

In an embodiment of the present invention, the step of generating the noise map corresponding to the luminance image includes determining a noise range and a noise offset of each of the pixels of the luminance image so as to generate a single element of the noise map, then determining a blurring mask of each element of the luminance images so as to generate an image mask indication map and performing a blurring process on the corresponding single pixel noise map according to the corresponding element of image mask indication map so as to generate the blurred noise map.

In an embodiment of the present invention, the step of determining the noise range and the noise offset of each of the pixels of the luminance image so as to generate the single pixel noise map includes determining the noise range according to a block characteristic and a luminance value of the luminance image, generating a noise value at random within the noise range, performing a look-up process according to the luminance value of the luminance image so as to obtain the noise offset and adding the noise offset to the noise value of each of the pixels so as to obtain the single pixel noise map.

In an embodiment of the present invention, the step of determining the blurring mask of each of the pixels of the luminance images so as to generate the image mask indication map includes selecting a corresponding blurring mask collection from a blurring mask database according to a block characteristic of the luminance image and a luminance value of each of the pixels and selecting a blurring mask for each of the pixels at random from each of the blurring mask collections so as to form the image mask indication map.

In an embodiment of the present invention, the blurring mask database stores a plurality of blurring masks of different sizes and different styles.

To sum up, the image processing method provided by the present invention may output a processed image including image detail information and achieving a noise-reducing effect. Meanwhile, by the method, a blocky effect generated by noise-reduction may be avoided, and discontinuousness of the image may be eliminated, such that the processed image looks more natural.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

First Exemplary Embodiment

In the present exemplary embodiment, to avoid an unnatural appearance of a noise-reduced image, a source image is separated as two resulted images by two different image processing flows. One of the images includes more noise and image detail information, while the other has less noise but and detail information, and finally, a weight operation is performed on the two resulted images so as to generate a processed image having a noise-reducing effect and including more image detail information.

Figure 1:
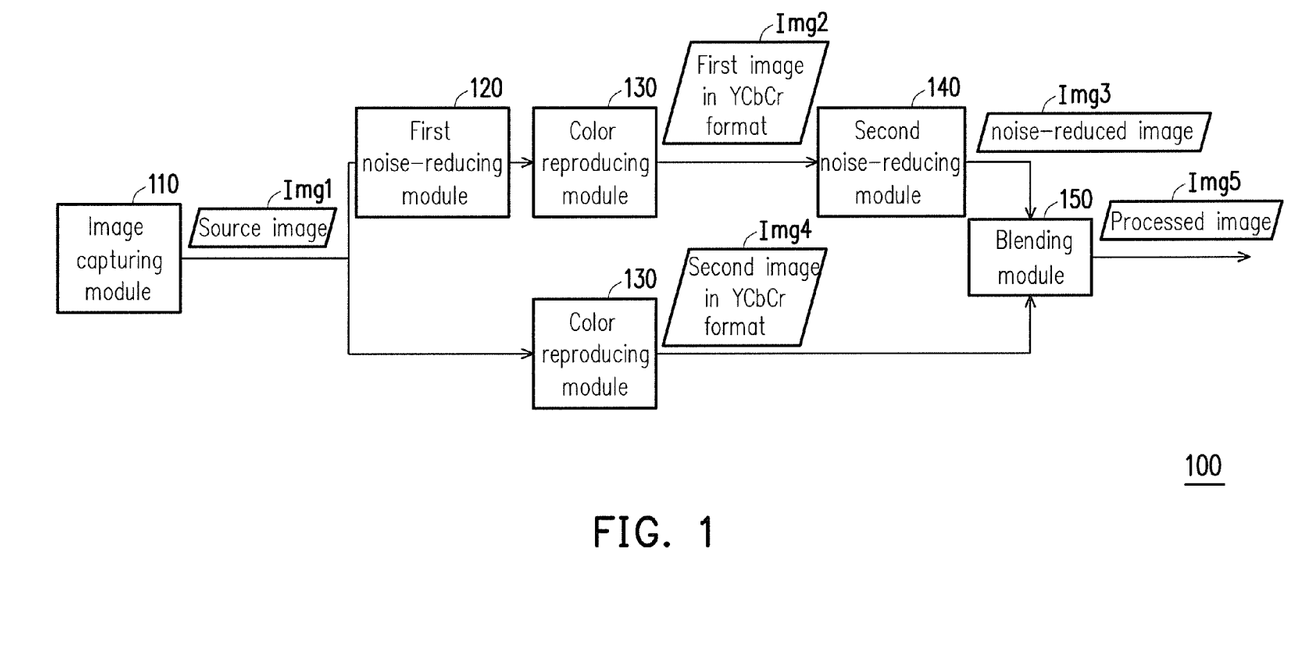
FIG. 1 is a block view illustrating an image processing device according to the first exemplary embodiment of the present invention.

FIG. 1 is a block view illustrating an image processing device according to the first exemplary embodiment of the present invention. An image processing device 100 is, for example, a digital camera, a SLR camera, a digital video camera or any other electronic device having an image processing function, such as a smart phone, a tablet computer, a notebook computer or a desktop computer, and the present invention is not limited thereto.

Referring to FIG. 1, the image processing device 100 includes an image capturing module 110, a first noise-reducing module 120, a color reproducing module 130, a second noise-reducing module 140 and a blending module 150. The image capturing module 110 includes elements, such as a lens, a photosensitive element and so forth, which are used to capture images. The color reproducing module 130, the first noise-reducing module 120, the second noise-reducing module 140 and the blending module 150 may be functional blocks implemented by software and/or hardware. Therein, the hardware may include hardware elements having an image processing function, such as a central processing unit (CPU), a system on chip (SOC), an application specific integrated circuit (ASIC), a digital signal processor (DSP) or a combination thereof, and the software may be one or more programs executing or running in an operation system (OS) and so forth.

Figure 2:
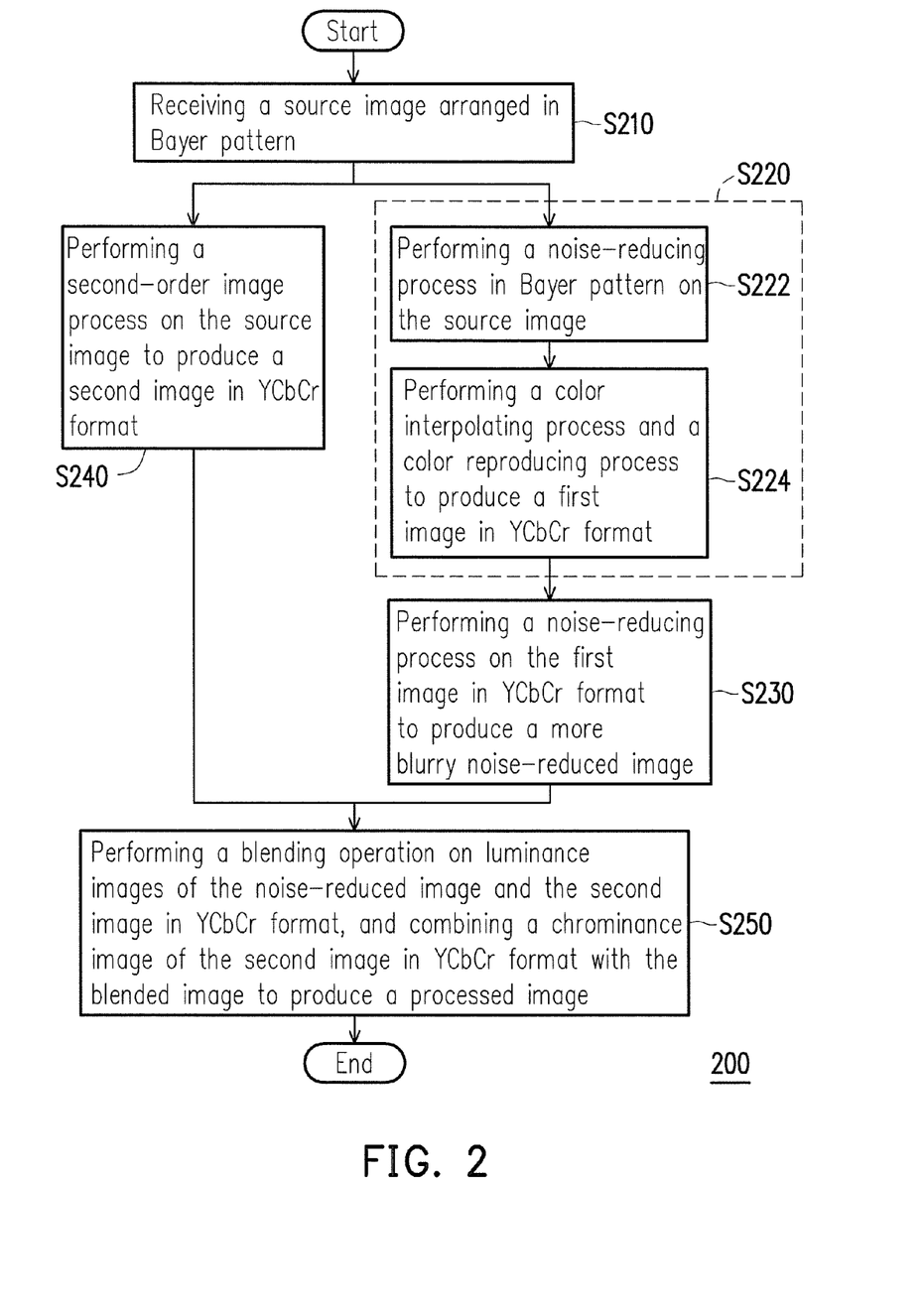
FIG. 2 is a flowchart illustrating an image processing method according to the first exemplary embodiment of the present invention.

FIG. 2 is a flowchart illustrating an image processing method according to the first exemplary embodiment of the present invention. Referring to FIG. 2, a method 200 of the present exemplary embodiment is adapted to the image processing device 100, and detailed steps of the present exemplary embodiment will be described with reference to each module of the image processing device 100.

First, in step S210, the image capturing module 110 is configured to capture a source image Img1 arranged in Bayer pattern.

Next, in step S220, a first-order image process is performed on the source image Img1 to produce a first image in YCbCr format Img2. Step S220 may be further divided into sub-steps S222 and S224. Namely, the first-order image process includes steps as follows. First, the first noise-reducing module 120 is configured to perform a noise-reducing process in Bayer pattern on the source image Img1 (step S222). Thereafter, the color reproducing module 130 is configured to perform a color interpolating process and a color reproducing process to produce the first image in YCbCr format Img2 (step S224).

In detail, since each pixel of the source image Img1 arranged in Bayer pattern has only one color of an R channel, a G channel or a B channel, rather than an image in RGB or YCbCr format that is used for the general display. Thus, the color reproducing module 130 performs the color interpolating process to produce an image in RGB format used for the general display. Moreover, in order to present the color correctly, the color reproducing module 130 further performs the color reproducing process, such as a black offset, a RGB gain adjustment, a color correction, a Gamma correction, color reproducing process and so forth. Then, the color reproducing module 130 performs a conversion process and outputs the first image in YCbCr format Img2.

Then, in step S230, the second noise-reducing module 140 further perform a noise-reducing process on the first image in YCbCr format Img2 to produce a more blurry noise-reduced image Img3. Generally, object details or textures in the noise-reduced image Img3 would disappear with the noise-reducing process, which make human eyes feel unnatural.

On the other hand, in step S240, the color reproducing module 130 further performs a second-order image process on the source image Img1 to produce a second image in YCbCr format Img4. The second-order image process includes a step of directly performing the color interpolating process and the color reproducing process on the source image Img1 by the color reproducing module 130 to produce the second image in YCbCr format Img4 having clearer details. Therein, the color reproducing module 130 performs some process such as color correction to change the distribution and value of noise which may make the processed image looks unnatural (e.g., some color saturation regions contain higher noise and human eyes are sensitive to such noise). Thus, the color reproducing module 130 adjusts corresponding parameters of the color correction. Comparing with the first-order image process, the strength of color correction is much weaker, such that image luminance noise of the second image in YCbCr formatImg4 may be reserved. In other words, a noise reducing degree of the noise-reduced image Img3 is higher than that of the second image in YCbCr format Img4.

In step S250, the blending module 150 first performs a blending operation (i.e., a weighting sum operation) on a luminance image of the more blurry noise-reduced image Img3 and a luminance image of the second image in YCbCr format Img4 having more details. Finally, the blending module 150 combines a chrominance image of the second image in YCbCr format with the blended image to produce a processed image Img5 containing more object details. It is to be mentioned that since the noise is also included to the output processed image Img5 by the blending/weighting operation, the blocky unnatural sense after noise-reduction may be mitigated, which results in a more natural image.

Since the degrees of human visual sensation to the noise of light and dark regions are different, the blending module 150 determines the weighting parameters by referring to luminance value of the noise-reduced image Img3 while the blending/weighting operation is finally performed, such that image Img5 having a better human visual sensation is produced. For instance, for the pixels with a luminance value of 100 of the noise-reduced image Img3, a weighting parameter for the blending module 150 to blend the noise-reduced image Img3 and the second image in YCbCr format Img4 is set as 80:20. Since the human eyes are commonly more sensitive to the dark noise, pixels with a luminance value of 10 of the noise-reduced image Img3, a weight for the blending module 150 to blend the noise-reduced image Img3 and the second image in YCbCr format Img4 is set as 90:10. In an embodiment, a weighting set for different luminance values may be, for example, predetermined and stored in a look-up table, such that the blending module 150 may quickly look up in a memory unit (not shown in FIG. 1) for a corresponding weighting setting.

In the present exemplary embodiment, since the first-order image process and the second-order image process have many identical or similar steps, which can use the same hardware (e.g., the color reproducing module 130) to reduce cost of hardware. The present exemplary embodiment may not only allow the noise-reduced image to retain the image detail information but also eliminate the discontinuousness of the image, such that the processed image may look more vivid.

Second Exemplary Embodiment

In the present exemplary embodiment, the unnatural sense of the noise-reduced images may be avoided by further randomly generating several noisy points in the image and blending the noisy points having different characteristics to the noise-reduced image to achieve the natural appearance reproduction technique.

Figure 3:
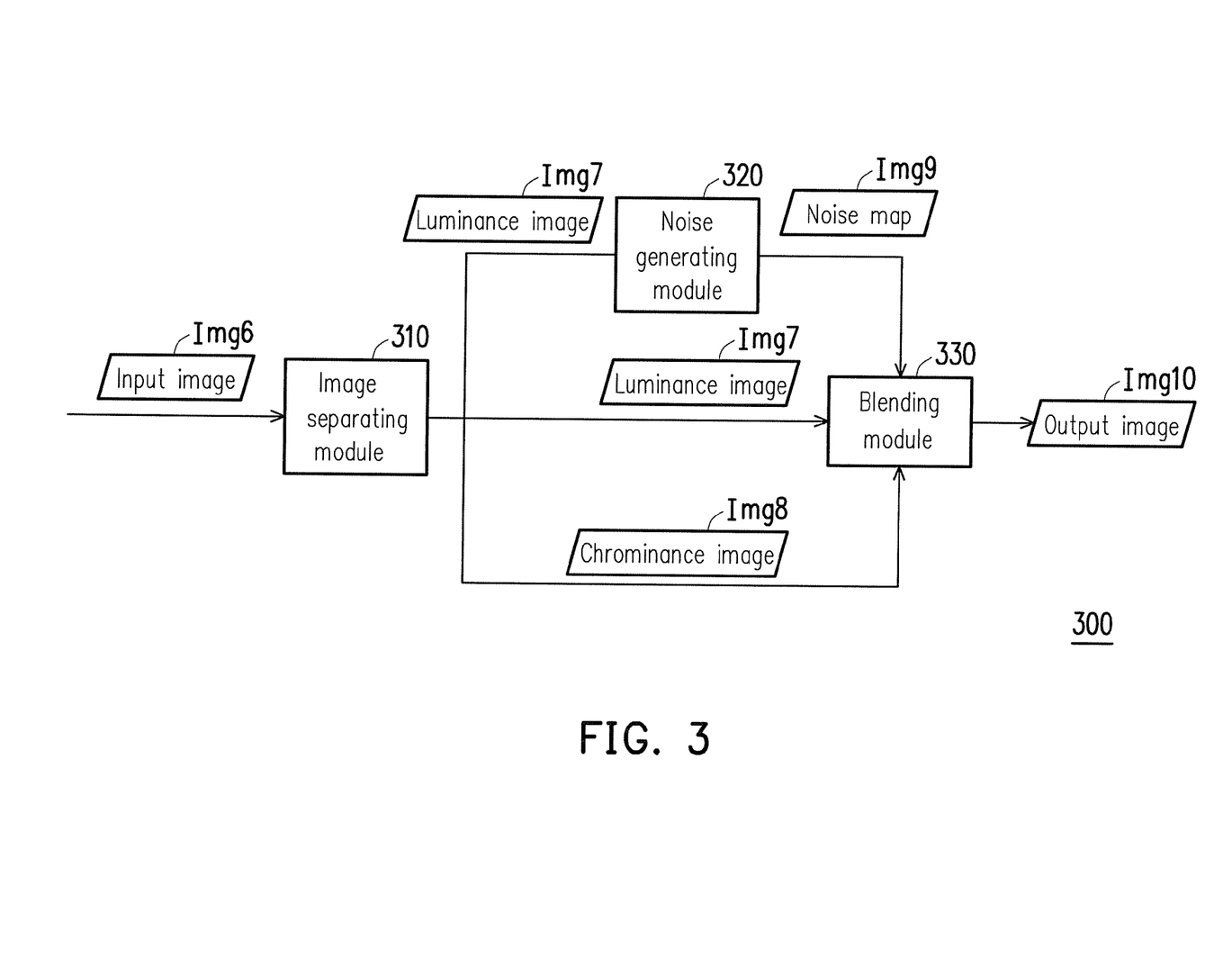
FIG. 3 is a block view illustrating an image processing device according to the second exemplary embodiment of the present invention.

FIG. 3 is a block view illustrating an image processing device according to the second exemplary embodiment of the present invention. An image processing device 300 is, for example, a digital camera, a SLR camera, a digital video camera or any other electronic device having an image processing function, such as a smart phone, a tablet computer, a notebook computer or a desktop computer, and the present invention is not limited thereto.

Referring to FIG. 3, the image processing device 300 includes an image separating module 310, a noise generating module 320 and a blending module 330. The image separating module 310 is configured to separate a received input image into a luminance image (i.e., an image only has information in luminance channel, i.e. Y-Channel.) and a chrominance image (i.e., an image only had information in chrominance channel, i.e. CbCr-channel image). The noise generating module 320 is configured to generate a noise map. The blending module 330 is configured to blend the luminance image, the noise map then combine with the chrominance image to produce an output image having noise with different characteristics. Each of the aforementioned modules may be functional blocks implemented by software and/or hardware. Therein, the hardware may include hardware elements having an image processing function, such as a central processing unit (CPU), a chipset, a microprocessor or a combination thereof, and the software may be an operation system (OS), driving programs and so forth.

Figure 4:
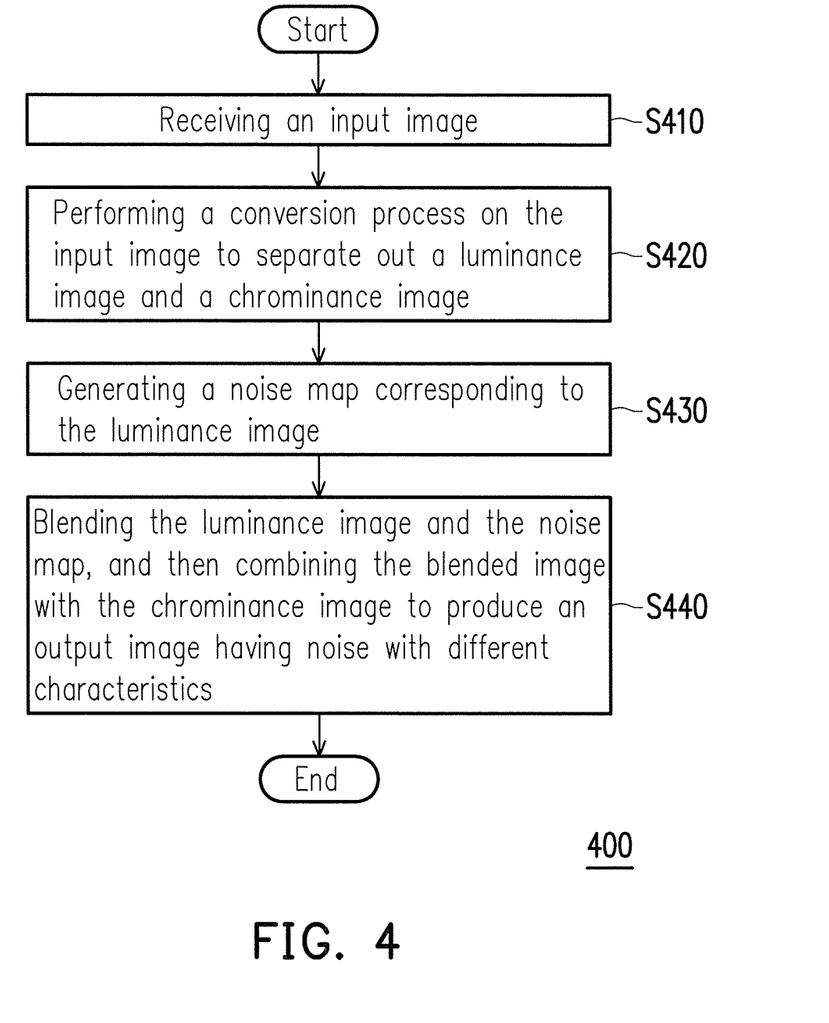
FIG. 4 is a flowchart illustrating an image processing method according to the second exemplary embodiment of the present invention.

FIG. 4 is a flowchart illustrating an image processing method according to the second exemplary embodiment of the present invention. Referring to FIG. 4, a method 400 of the present exemplary embodiment is adapted to the image processing device 300, and detailed steps of the present exemplary embodiment will be described with reference to each module of the image processing device 300.

In step S410, the image separating module 310 receives an input image Img6. The input image Img6 is, for example, the second image in YCbCr foiniat Img4 in the first exemplary embodiment. Then, in step S420, the image separating module 310 performs a conversion process on the input image Img6 to separate out a luminance image (i.e., a Y-channel image) Img7 and a chrominance image (i.e., a CbCr-channel image) Img8. The luminance image Img7 is transmitted to the noise generating module 320 and the blending module 330, respectively, while the chrominance image Img8 is transmitted to the blending module 330 directly.

In step S430, the noise generating module 320 generates a noise map Img9 corresponding to the luminance image Img7. A size of the noise map Img9 is identical to that of the luminance image Img7. The noise map Img9 includes a plurality of positive or negative values, and each of the values corresponds to each pixel in the luminance image Img7.

Finally, in step S440, the blending module 330 blends the luminance image Img7, the noise map Img9 and then combines the blended image with the chrominance image Img8 to produce an output image Img10 having noise with different characteristics. In detail, the blending module 330 first adds a luminance value of each pixel in the luminance image Img7 to each corresponding noise value in the noise map Img9 to produce a luminance image containing the noise points. The blending module 330 then blend the luminance image that is contained the noise points and the chrominance image Img8 to produce the output image Img10 having a natural sense. Therein, the input image Img10 is, for example, used as the image input into the blending module 150 of the first exemplary embodiment.

It is to be mentioned that adding the noise points into the luminance image Img7 is equivalent to offsetting the noise-reducing function, and thus, the noise points are not generated randomly but have to conform to natural perspectives of a user. That is to say, a human visual preference has to be incorporated by reference. In the present exemplary embodiment, the noise points of different sizes, strength and trends are added in according to different luminance of the image to provide a better visual sensation for the user. How the noise generating module 320 generates the noise map Img9 corresponding to the luminance image Img7 in the present exemplary embodiment will be described in detail with reference to FIG. 5 and FIG. 6 hereinafter.

Figure 5:
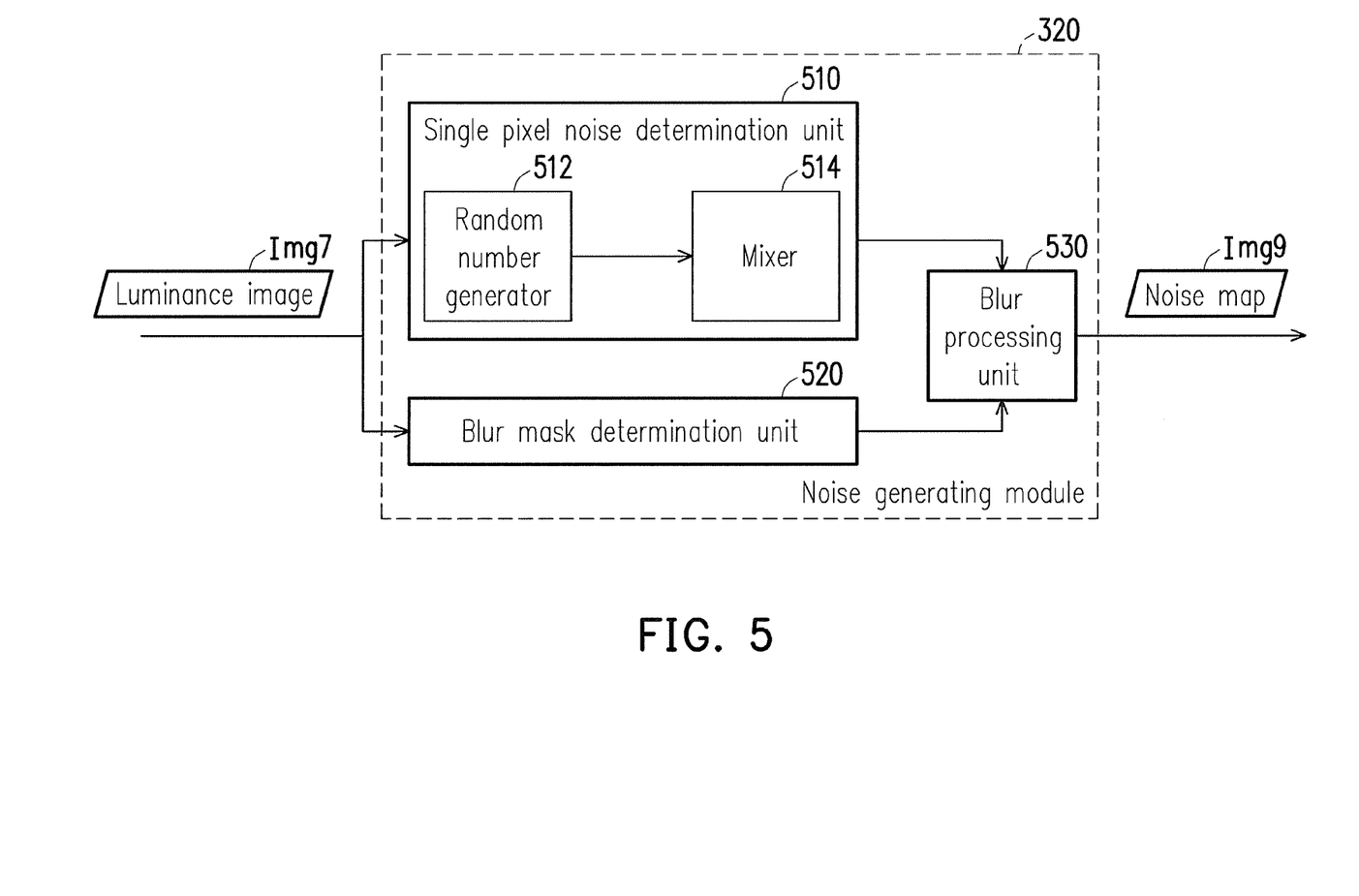
FIG. 5 illustrates a detailed implementation type of the noise generating module according to the second exemplary embodiment of the present invention.

FIG. 5 illustrates a detailed implementation type of the noise generating module 320 according to the second exemplary embodiment of the present invention. Referring to FIG. 5, the noise generating module 320 includes a single pixel noise determination unit 510, a blur mask determination unit 520 and a blur processing unit 530. The single pixel noise determination unit 510 further includes a random number generator 512 and a mixer 514.

Figure 6:
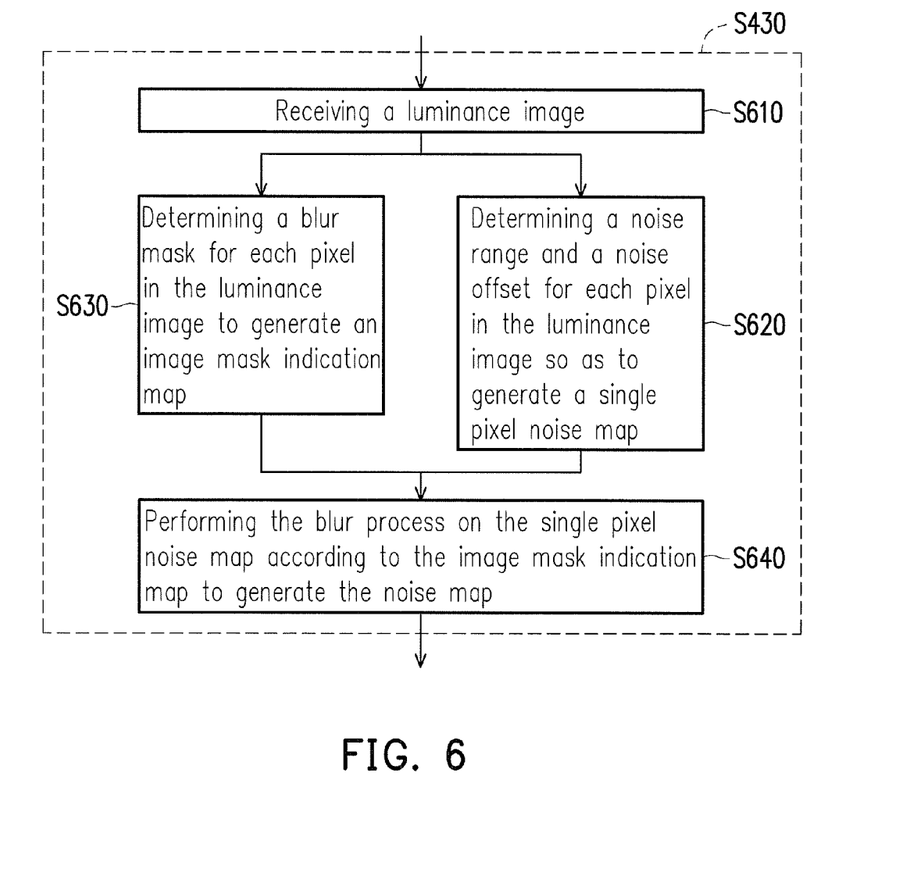
FIG. 6 illustrates detailed steps of generating a noise map corresponding to the luminance image according to the second exemplary embodiment of the present invention.

FIG. 6 illustrates detailed steps of generating a noise map corresponding to the luminance image according to the second exemplary embodiment of the present invention.

First, in step S610, the noise generating module 320 receives a luminance image Img7. The luminance image Img7 is transmitted to the single pixel noise determination unit 510 and the blur mask determination unit 520 to be processed.

In step S620, the single pixel noise determination unit 510 first determines a noise range and a noise offset for each pixel in the luminance image so as to generate a single pixel noise map. To be specific, the single pixel noise determination unit 510 first determines a noise range ($-TH_{range}$, $TH_{range}$) according to a block characteristic and a luminance value of each pixel of the of the luminance image Img7, wherein $TH_{range}$ is a positive value greater than 0. Then, the random number generator 512 generates a noise value at random, and the noise value falls within the noise range ($-TH_{range}$, $TH_{range}$). Then, the mixer 514 further adds a corresponding noise offset to the noise value to control an average strength of the noise. After each pixel in the luminance image Img7 is processed by the aforementioned steps, a single pixel noise map may be obtained. Therein, the noise offset may be pre-determined in a table format by a person having ordinary skills in the technical field, in which a look-up operation is performed according to a luminance value of the luminance image Img7 to obtain the noise offset. The noise offset further features in enhancing an image contrast, such that the light portion of the image becomes lighter, and the dark portion of the image becomes darker.

On the other hand, in step S630, the blur mask determination unit 520 determines a blur mask for each pixel in the luminance image to generate an image mask indication map. To be specific, a value change of each noise in the single pixel noise map may be different from an appearance distribution of a natural noise, while the natural noise may be clustered to form a distribution in a circular shape or any other shape. Thus, an image mask has to be applied to the single pixel noise map to produce noise in different styles, and the image mask as referred herein is a blur mask.

Since the noise styles of the image varies with the luminance and even the same luminance has various types of noise styles, the blur mask determination unit 520 may first select a corresponding blur mask collection from a blur mask database according to the block characteristic of the luminance image and the luminance value of each pixel. The blur mask database stores a plurality of blur masks having different sizes and styles. For example, a blur mask may be a standard mask having a size of N*N, wherein N is a positive integer greater than 0. In the blur mask database, each blur mask is assigned with a number, and if it is assumed that there are 10 blur masks in the blur mask database, they are individually assigned with numbers from 1 to 10.

For example, Table 1 is a table of luminance and blur mask collections according to the second exemplary embodiment. Referring to Table 1, a blur mask assigned with a number of 1, 2 or 5 may be applied corresponding to the a luminance value of 0, and a blur mask assigned with a number of 2, 3 or 4 may be applied corresponding to the luminance value of 1 and so on, likewise.

TABLE 1

| Luminance value | Blur mask collection |
| --- | --- |
| 0 | 1, 2, 5 |
| 1 | 2, 3, 4 |
| 2 | 1, 3 |
| ... | ... |
| 255 | 10 |

The blur mask determination unit 520 then performs the look-up operation according to the luminance value so as to select a blur mask corresponding to the pixel at random from a corresponding blur mask collection and record the assigned number thereof. After the assigned number of the corresponding blur mask is recorded in each pixel, the image mask indication map of the present exemplary embodiment is accordingly generated.

Returning to FIG. 6, in step S640, the blur processing unit 530 performs the blur process on the single pixel noise map according to the image mask indication map, such that the noise map Img9 having different characteristics is accordingly generated.

In view of the above, the present invention adopts a dual-path image processing method, wherein the first-order image process is to produce the blur image after the noise-reducing process, and the second-order image process is to produce the clear image retaining the image detail information and/or having noise with different characteristics. Accordingly, the weighting operation and the blend process are performed on the two images with the consideration of the light and dark degrees of the images so as to output the processed image containing the image detail information and achieving the noise-reducing effect. In addition, by the image processing method provided by the present invention, a blocky effect generated after normal noise-reduction may be avoided, and discontinuousness of the image may be eliminated, such that the processed image presents a natural appearance.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image processing method, comprising:
receiving a source image;
performing a first-order image process on the source image to produce a first image in YCbCr format;
performing a second-order image process on the source image to produce a second image in YCbCr format;
performing a noise-reducing process on the first image in YCbCr format to produce a noise-reduced image; and
performing a blending operation on a luminance image of the noise-reduced image and a luminance image of the second image in YCbCr format and combining with a chrominance image of the second image in YCbCr format to produce a processed image, wherein a noise reducing degree of the noise-reduced image is higher than a noise reducing degree of the second image in YCbCr format.

2. The image processing method according to claim 1, wherein the step of performing the first-order image process comprises:
performing a Bayer noise-reducing process on the source image in Bayer pattern and performing a color interpolation process and a color reproduction process to produce the first image in YCbCr format.

3. The image processing method according to claim 1, wherein the step of performing the second-order image process comprises:
   directly performing the color interpolation process and the color reproduction process on the source image to produce the second image in YCbCr format.

4. The image processing method according to claim 1, wherein after the step of performing the second-order image process on the source image to produce the second image in YCbCr format, the method further comprises:
   performing a conversion process on the second YCbCr format image to separate out a luminance image and a chrominance image;
   generating a noise map corresponding to the luminance image; and
   blending the luminance image, the noise map into a blended image and then combining the blended image with the chrominance image to produce an output image having noise with different characteristics.

5. The image processing method according to claim 4, wherein an image size of the noise map is identical to an image size of the luminance image.

6. The image processing method according to claim 4, wherein the noise map comprises a plurality of positive values or negative values, and each of the values corresponds to each pixel in the luminance image.

7. The image processing method according to claim 4, wherein the step of generating the noise map corresponding to the luminance image comprises:
   determining a noise range and a noise offset of each of the pixels of the luminance image to generate a single pixel noise map;
   determining a blur mask of each of the pixels of the luminance images to generate an image mask indication map; and
   performing a blur process on the corresponding single pixel noise map according to the image mask indication map to generate the noise map.

8. The image processing method according to claim 7, wherein the step of determining the noise range and the noise offset of each of the pixels of the luminance image to generate the single pixel noise map comprises:
   determining the noise range according to a block characteristic and a luminance value of the luminance image;
   generating a noise value at random within the noise range;
   performing a look-up process according to the luminance value of the luminance image to obtain the noise offset; and
   adding the noise offset to the noise value of each of the pixels to obtain the single pixel noise map.

9. The image processing method according to claim 7, wherein the step of determining the blur mask of each of the pixels of the luminance images to generate the image mask indication map comprises:
   selecting a corresponding blur mask collection from a blur mask database according to a block characteristic of the luminance image and a luminance value of each of the pixels; and
   selecting a blur mask for each of the pixels at random from each of the blur mask collections to form the image mask indication map.

10. The image processing method according to claim 9, wherein the blur mask database stores a plurality of blur masks of different sizes and different styles.

* * * * *